United States Patent Office 3,305,243
Patented Feb. 21, 1967

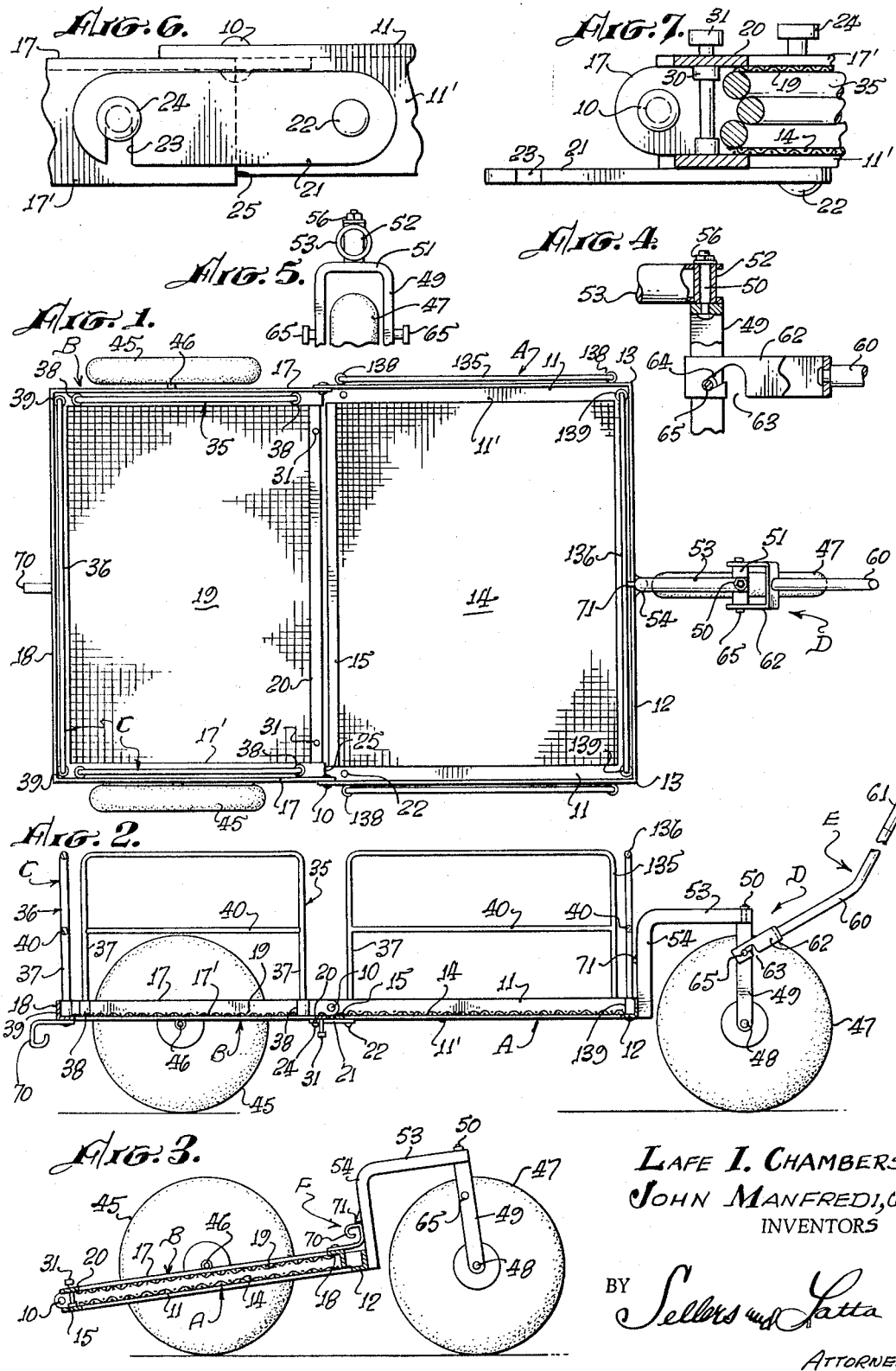

3,305,243
FOLDABLE LUGGAGE CART
John Manfredi, Jr., 13506 Gladstone Ave., Sylmar, Calif. 91342, and Lafe I. Chambers, 1912 1st St., San Fernando, Calif. 91340
Filed Nov. 23, 1964, Ser. No. 413,117
10 Claims. (Cl. 280—36)

This invention relates to foldable luggage carts and has as its general object to provide an improved luggage-transporting cart which can be folded into a fairly compact package which, for example, can be normally carried in the trunk of an automobile.

Toward the attainment of this general object, the invention provides a luggage carrier:

(1) Comprising a pair of bottom sections hinged to one another for folding into a package having a volume only slightly greater than that of one of the sections;

(2) Embodying extension sides attachable to the bottom sections and removable wherefrom for permitting the bottom sections to be folded together;

(3) The bottom sections, when folded together, cooperating to form a carrying case in which the detached side members can be stored;

(4) Having an improved tricycle arrangement embodying a pair of rear wheels and a single steerable front wheel which can be detached from the forward base section;

(5) Embodying an improved detachable draw bar operable for both pulling and steering the cart through the steerable front wheel;

(6) Useful for transporting refuse cans, garden tools and planting material, and other objects around a residence, shop, manufacturing establishment or the like;

(7) Also useful for transporting luggage and the like to a truck or automobile and from the same to a railway station or airport terminal.

Other objects and advantages will become apparent in the ensuing specification and appended drawing in which:

FIG. 1 is a plan view of a foldable luggage cart embodying the invention;

FIG. 2 is a longitudinal sectional view thereof;

FIG. 3 is a longitudinal sectional view of the cart in folded condition;

FIG. 4 is a fragmentary side elevational view of the steering and draw bar linkage, with parts broken away and shown in section;

FIG. 5 is a fragmentary front elevational view of the same, omitting the draw bar;

FIG. 6 is an inverted plan view of one of the latching braces for rigidifying the sectional bottom of the cart; and FIG. 7 is a detail sectional view illustrating one of the retainer plungers for holding the detachable racks in stowed condition within the folded cart.

Referring now to the drawings in detail, I have shown therein, as an example of one form in which my invention may be embodied, a foldable luggage cart comprising, in general, a forward bottom section A, a rearward bottom section B having extension racks C for side and back; and tricycle supporting mechanism D including a pair of back wheels and a steerable front wheel; a detachable draw bar E; and latch means F (FIG. 2) for securing the cart in folded condition.

Forward bottom section A is hinged to rear bottom assembly B on a median transverse axis by means of pivots 10, providing for folding of the base sections one upon the other to provide a carrying case as shown in FIG. 2.

Forward bottom section A comprises a U-shaped frame embodying side arms 11 and a forward transverse connecting bar 12, all formed thereof of angle iron and joined by integral corners 13. A bottom web 14 of woven wire or equivalent lightweight material is marginally secured to the lower margins of the side arms 11 and cross bar 12 around three of its sides, its fourth side being secured to a cross bar 15 the ends of which are secured to the side arms 11 near the hinge pivots 10.

Rear cart section B comprises a bottom section similar to bottom section A and comprising side arms 17, a rear cross bar 18 joined by integral corner bends to the side arms 17, and a bottom web 19 marginally secured to the lower edges of the arms 17 and cross bar 18 and to a cross bar 20 at its forward margin.

The side arms 11 of the forward bottom section A and the side arms 17 of the rear bottom section B project beyond respective bottom web cross bars 15 and 20, the projecting ends of said arms 11 overlapping the projecting ends of side arms 17 and secured thereto by the hinge pivots 10 (which can be in the form of bolts or rivets). After removal of the extension members of the rear bottom section B, it then becomes possible to fold the rear bottom section within the forward bottom section, the rear cross bar 18 clearing and nesting inwardly of the forward cross bar 12 (FIG. 3). The frame bars 11, 12, 17 and 18 of the respective bottom sections are of angle section as best illustrated in FIG. 2, and the webs 14 and 19 are secured to the inner faces of the inwardly projecting flanges 11' and 17' of the angle sections as indicated in FIG. 7.

The side members 11 and 17 of the respective bottom sections are secured to one another in bridging relation to the hinge pivots 10 (to rigidify the base of the cart when in use) by means of latch arms 21 (FIG. 6) each attached by a pivot 22 to the bottom flange of a respective side member 11 of forward bottom section A, and each having at its opposite end a hook slot 23 engageable with a keeper stud 24 secured in a respective bottom flange of a respective side member 17 of the rear bottom section B (FIGS. 3 and 4). The bottom flanges 11' and 17' of the side members 11, 17 are of the proper length to establish abutting engagement at 25 to prevent upward breaking of the cart bottom at pivots 10 beyond the co-planer relationship shown in FIG. 2. The latch bars 21, which lie snugly against the underfaces of the bottom flanges 11', 17' and project a substantial distance in each direction past the hinge axis of pivots 10, will prevent downward breaking at the hinge axis when the latch bars 21 are secured to the studs 24, as best shown in FIG. 2. Thus, the bottom is rigidified by the latch bars 21.

Rear base section B is provided with respective retainer devices each comprising a slide bearing bushing 30 (FIG. 7) secured to cross bar 20, and a retainer pin 31 slidable in the bushing 30 from a retracted position to a projected position (as shown in FIG. 7) in which it will function to retain the extension racks C against sliding from the rear of the folded cart.

Extension racks C comprise a pair of side racks 35 and a rear rack 36, for rear bottom section B, and corresponding side racks 135 and 136 for front bottom section A. Each of these racks is constructed of metal rod and includes a yoke portion having legs 37 receivable in vertical sockets 38 and 39 (short tube sections) secured to the side arms 17 and rear cross bar 18 respectively of the rearward bottom section B, and in corresponding sockets 138, 139 on the front section A. Each of the yokes 35, 36 may include a medial cross bar 40 bridging between and secured to its respective legs 37 and functioning both as a brace for the legs and as a retainer bar for articles carried in the cart.

Tricycle apparatus D comprises a pair of rear wheels 45 journalled upon stub axles 46 secured to the underside of the bottom webs 17' of a respective side arms 17 of the rear bottom frame. A steerable front wheel 47 is mounted on an axle 48 in the lower end of a steering fork 49 which has a kingpin 50 secured in its bridging web 51 at its upper end and projecting upwardly therefrom. Kingpin 50 is rotatably mounted in suitable bearing means (e.g. a vertical bushing 52) in the forward end of the horizontal arm 53 of a front wheel bracket of inverted L-form which includes a vertical arm 54 the end of which is secured (e.g. by welding) to the rear of forward cross bar 12 of the forward bottom section A. The height of front wheel bracket 53, 54 is such as to position the forward end of the bottom A, B in a plane immediately above the axles 46 of the rear wheels, whereby the base is horizontal. The upper end of kingpin 50 may be secured by suitable fastener means such as a nut 56 threaded thereon.

Drawbar E comprises a bar 60 having at its forward end a suitable yoke handle 61 having its rear end secured to the transverse web of a coupling yoke 62 which is shown in detail in FIG. 4. Yoke 62 embodies parallel side arms having, near their rear ends, respective bayonet slots each including a vertical entry portion 63 and a pocket portion 64 extending downwardly and rearwardly at an acute angle from the upper end of the entry portion 63. In the side arms of the wheel fork 49 are secured respective coupling studs 65 (FIG. 5) which are receivable in the respective pockets 64. The studs 65 are so located and the draw bar yoke 62 is so proportioned with reference to the periphery of front wheel 47 that the cross web of yoke 62 may engage the wheel 47 to normally support the draw bar in a raised position as shown in FIG. 2, where its handle 61 may be readily grasped. The upward inclination of pockets 64 provides a camming action, when the handle is supported in this manner, the yoke 62 fulcruming against the wheel 47 and being tilted upwardly by leverage action of drawbar 60 under the pull of gravity, and thus resisting any tendency of the yoke 62 to slip rearwardly to a position where the drawbar E could become detached by release of retainer studs 65 through the entry portion 63 of the bayonet slots. The studs 65 are preferably headed studs to retain the side arms of yoke 62 against slipping off the ends of the studs. By shifting the drawbar E rearwardly to bring the studs 65 into alignment with the entry slots 63 and lifting the yoke end of the drawbar it can be readily detached.

The camming action of coupling studs 65 and inclined pockets 64 facilitates the release of the drawbar from the front wheel fork in the following manner: when the handle 61 is lifted without exerting a forward pull, the inclination of pockets 64 will tend to cause the draw bar yoke 62 to gravitate rearwardly and downwardly until the studs 65 are at the upper extremities of the pockets 64, in alignment with the entry slots 63.

The drawbar yoke 62 provides both a draft and a steering connection between the drawbar and the front wheel fork 49. The yoke 62 further functions as a brake to prevent rolling of the cart when engaged against the wheel 47 as in FIG. 1. By pushing downwardly against the drawbar 60, the operator can intensify the braking action as needed.

In folding the cart, the racks C are detached from the frame sections A and B by lifting them from their sockets, and they are then laid flatly against the bottom section A adjacent the forward cross bar 12. The rear bottom section B is then folded over the front bottom section A. The retainer pins 31, which are retracted during this operation, are then dropped downwardly to the position shown in FIG. 7 to retain the racks C against slipping through the rear of the folded cart. Before folding, the latch bars 21 are first swung outwardly to release the studs 24 from their hook slots 23. In the folded condition, the cart may be positioned as shown in FIG. 3, with its wheels 45 and 47 resting against a ground or floor surface, so that the folded cart can be wheeled into a storage space in a garage or the like. The drive bar E can be detached and laid on top of the folded cart.

Latch means F comprises a movable latch element 70 attached to the underside or rear frame bar 18 of bottom section B and engageable with a keeper element 71 secured to the rear side of vertical arm 54 of the front wheel bracket, as shown in FIG. 3. Latch element 70 may be a resilient tongue of spring strap metal, as shown, or a slidable latch bolt or other equivalent latch element.

We claim:

1. A foldable luggage cart comprising a pair of rectangular bottom sections having adjoining transverse margins and hingedly connected to one another at said adjoining margins for folding movement of one of said sections upon the other; releasable means operable to provide bridging connections between said bottom sections across said adjoining margins for rigidifying the hinged connections between said sections with the sections in a common plane; a pair of rear wheels supporting the rear bottom section; an inverted L-form front wheel bracket having a vertical leg secured to and extending upwardly from the center of the forward side of the front bottom section in the use position of the cart and a horizontal arm projecting forwardly from said vertical leg; and a steerable front wheel attached to the forward end of said horizontal arm and extending downwardly for approximately half its diameter below the plane of said front bottom section and rearwardly beneath said horizontal arm, said front wheel bracket and front wheel projecting past the rear side of the rear bottom section when the cart is folded and said rear wheels then projecting beyond the plane of said rear bottom section to approximately the same height as said front wheel bracket.

2. A foldable luggage cart comprising a pair of rectangular bottom sections having adjoining transverse margins and hingedly connected to one another at said adjoining margins for folding movement of one of said sections upon the other; releasable means operable to provide bridging connections between said bottom sections across said adjoining margins for rigidifying the hinged connections between said sections with the sections in a common plane; a pair of rear wheels supporting the rear bottom section; an inverted L-form front wheel bracket having a vertical leg secured to and extending upwardly from the center of the forward side of the front bottom section and a horizontal arm projecting forwardly from said vertical leg; and a steerable front wheel attached to the forward end of said horizontal arm and extending beneath said horizontal arm, said front wheel bracket and front wheel projecting past the rear side of the rear bottom section when the cart is folded, all three of said supporting wheels being engageable in rolling contact with a supporting surface when the cart is folded, with the rear wheels projecting downwardly past respective sides of the forward bottom section in embracing relation thereto.

3. A foldable cart as defined in claim 2, including a front wheel fork having at its upper end a cross web pivotally connected to the forward end of said horizontal arm of the wheel bracket on a vertical axis for steering movements of said fork and the front wheel.

4. A foldable cart as defined in claim 3, including a pair of coupling studs secured in and projecting laterally from the sides of said front wheel yoke, and a detachable drawbar having at its rear end a coupling yoke provided with bayonet slots in which said coupling studs are receivable for coupling said drawbar to said steering yoke in a manner such that both traction and steering movements can be transmitted therefrom to said yoke.

5. A foldable cart comprising a pair of rectangular bottom sections having respective yoke-shaped frames of angle iron including respective side arms and cross bars connecting said side arms at the front and back of the cart, said side arms having respective horizontal bottom flanges and vertical side flanges extending upwardly therefrom, the side flanges extending beyond the ends of the bottom flanges in overlapping relation at a transverse hinge axis and being connected by pivots on said axis to provide hinged connections between said side arms with the bottom flanges disposed in a common plane when the bottom sections are extended, and having their adjoining ends abutting one another to brace the bottom sections against upward breaking from a common horizontal plane; latch devices providing releasable connections between said side arms bridging across said hinge axis on the under sides of said horizontal flanges so as to rigidify said bottom sections against downward breaking from said common horizontal plane; and wheel supports for the respective bottom sections.

6. A foldable cart as defined in claim 5, wherein each of said latch devices comprises a bar having one end pivotally connected to the underside of the horizontal flange of one side arm and having a hook slot at its other end; and a coupling stud secured in the horizontal flange of the adjoining side arm and receivable in said hook slot upon swinging said latch arm about its pivot horizontally into alignment with the adjoining side arms.

7. A foldable cart as defined in claim 5, including tubular sockets secured to the side arms of the rear bottom section in vertical positions along the inner faces of the vertical flanges thereof and near the forward and rear extremities of said side arms; and a pair of side racks having vertical legs with free lower ends receivable in said sockets to detachably mount said racks to the respective sides of said rear bottom section.

8. A foldable cart as defined in claim 5, including tubular sockets secured to the side arms of the rear bottom sections in vertical positions along the inner faces of the vertical flanges thereof and near the forward and rear extremities of said side arms; a pair of side racks having vertical legs with free lower ends receivable in said sockets to detachably mount said racks to the respective sides of said rear bottom section; a pair of tubular sockets secured to the frame of said rear bottom section in the rearward corners thereof in vertical positions adjacent the vertical flanges thereof; and a rear transverse rack having vertical legs with free lower ends receivable in the last mentioned sockets to hold said rear rack extending transversely along the rear side of the cart bottom.

9. A luggage cart including a bottom; a front wheel bracket of inverted L-form having a vertical leg secured to the center of the front side of said bottom and projecting upwardly therefrom and a horizontal arm projecting forwardly from the upper end of said vertical leg; and a steerable front wheel assembly including a wheel fork having at its upper end a transverse web pivoted on a vertical axis to the forward end of said horizontal arm and having side arms projecting downwardly therefrom; and a steerable front wheel journalled between the lower ends of said side arms of said fork, said cart further including a pair of coupling studs secured to and projecting laterally from said fork side arms; and a detachable drawbar including at its rearward end a yoke having side arms provided with bayonet slots including respective entry slots extending upwardly from the lower margins of said yoke arms and keeper pockets projecting rearwardly from the upper ends of said entry slots and adapted to receive said coupling studs to provide a draft and steering connection between said drawbar and said wheel fork.

10. A cart as defined in claim 9, wherein said rearwardly extending pockets are inclined downwardly and rearwardly from the upper ends of said entry slots to provide a camming action tending to cause said drawbar yoke to gravitate to a position in which said coupling studs are aligned with said entry slots when said drawbar is lifted and forward pull is not applied thereto, whereby to facilitate release of the drawbar from the wheel fork.

References Cited by the Examiner
UNITED STATES PATENTS

| | | | |
|---|---|---|---|
| 781,243 | 1/1905 | Thompson | 280—36 |
| 2,849,241 | 8/1958 | Owen | 280—36 |
| 2,986,401 | 5/1961 | Altadonna | 280—36 |
| 3,073,615 | 1/1963 | Siewert | 280—37 |
| 3,079,172 | 2/1963 | Burwell | 280—37 |

BENJAMIN HERSH, *Primary Examiner.*

M. S. SALES, J. A. PEKAR, *Assistant Examiners.*